United States Patent
Hu

(10) Patent No.: US 7,813,238 B2
(45) Date of Patent: *Oct. 12, 2010

(54) METHOD AND SYSTEM FOR BUFFERING DATA FILE TO BUFFER MEMORY

(75) Inventor: Shao-chueh Hu, Hsin-Chu (TW)

(73) Assignee: MediaTek, Inc., Hsin-Chu (TW)

( * ) Notice: Subject to any disclaimer, the term of this patent is extended or adjusted under 35 U.S.C. 154(b) by 120 days.

This patent is subject to a terminal disclaimer.

(21) Appl. No.: 12/200,268

(22) Filed: Aug. 28, 2008

(65) Prior Publication Data

US 2008/0313419 A1 Dec. 18, 2008

Related U.S. Application Data

(63) Continuation of application No. 10/617,807, filed on Jul. 14, 2003, now Pat. No. 7,433,280.

(30) Foreign Application Priority Data

Oct. 15, 2002 (TW) .............................. 91123669 A

(51) Int. Cl.
*G11B 20/10* (2006.01)

(52) U.S. Cl. .................................. 369/47.21; 369/47.29

(58) Field of Classification Search ........................ None
See application file for complete search history.

(56) References Cited

U.S. PATENT DOCUMENTS

| | | | | |
|---|---|---|---|---|
| 5,604,646 A * | 2/1997 | Yamawaki | ..................... | 360/53 |
| 5,983,309 A * | 11/1999 | Atsatt et al. | ..................... | 711/4 |
| 6,058,453 A * | 5/2000 | Packer | ..................... | 711/112 |
| 6,198,705 B1 * | 3/2001 | Tran et al. | ................. | 369/32.01 |
| 6,216,201 B1 * | 4/2001 | Ado et al. | .................... | 711/112 |
| 6,373,794 B2 * | 4/2002 | Packer | ..................... | 369/30.23 |
| 6,539,518 B1 * | 3/2003 | Fang et al. | ................... | 714/805 |
| 7,433,280 B2 * | 10/2008 | Hu | ........................... | 369/47.21 |
| 2001/0032292 A1 * | 10/2001 | Hoskins et al. | ............... | 711/112 |

\* cited by examiner

*Primary Examiner*—Joseph H Feild
*Assistant Examiner*—Tawfik Goma
(74) *Attorney, Agent, or Firm*—Patterson & Sheridan, LLP

(57) ABSTRACT

This invention provides a method and a system to read and buffer an audio data file from an optical storage medium into a buffer memory. The data file comprises blocks sequentially stored in the medium. Each block comprises a subcode block with encoded subcodes and a corresponding main data block with encoded audio data. The method first designates a starting block where buffering starts and searches for the starting block in the blocks. After the starting block is searched, trigger a main data block decoding procedure to decode the starting block and main data blocks in later blocks. According to the timing when the main data block decoding procedure is triggered, decide the timing to trigger buffering the decoded subcodes to the buffer memory. Therefore, the subcodes and corresponding audio data belonging to the same block before decoding can be buffered into the same buffer unit after decoding.

13 Claims, 5 Drawing Sheets though the preferred embodiment of this invention takes the audio data file as an example, the invention can also be applied to other data files, such as video files or graphics files. The coded data file can be divided into a plurality of blocks. Each block is divided into a subcode block and a corresponding main data block.

METHOD AND SYSTEM FOR BUFFERING DATA FILE TO BUFFER MEMORY

CROSS-REFERENCE TO RELATED APPLICATION

This application is a continuation of U.S. patent application Ser. No. 10/617,807 filed Jul. 14, 2003 now U.S. Pat. No. 7,433,280, which is herein incorporated by reference in its entirety.

BACKGROUND OF THE INVENTION

1. Field of the Invention

This present invention relates to a method and a system for buffering a data file into a buffer memory, especially to read a coded audio data file in an optical storage medium and buffering it to a buffer memory.

2. Description of the Prior Art

Please refer to FIG. 1 and FIG. 2. FIG. 1 is a schematic diagram of data arrangement for a conventional audio compact disk (CD) 10. FIG. 2 is a schematic diagram of a block 20 constituted with the frames 12 shown in FIG. 1. A conventional audio CD 10 comprises a plurality of frames 12. Each frame comprises a one-byte subcode 14 and two twelve-byte main data 16. Four-byte parities 18 exist between and after each of the main data 16, respectively.

Before a conventional CD drive receives command from a computer host to read the CD 10, a microprocessor of the CD drive detects errors for each of the frames 12. The microprocessor combines two main data 16 into a 24-byte main data 17. After error detection, the microprocessor combines 98 frames to constitute a block 20. Thus every audio data file in the CD 10 comprises a plurality of blocks 20 which are sequentially arranged. When the CD drive reads the audio data files in the CD 10, it reads the audio information from the blocks 20.

As shown in FIG. 2, each of the blocks 20 comprises a sync pattern 22, a subcode block 24 and a main data block 26. The sync pattern 22 is used to detect the starting point of the block 20. The subcode block 24 comprises a corresponding address and audio data file information of the block 20. In a conventional music CD, for example, the audio data file information records information about the title and duration of the song, and the like. The main data block 26 records the audio data file.

The conventional CD drive decodes and buffers the audio data file to a buffer memory in the CD drive, and then transmits the decoded audio data from the buffer memory to the computer host.

Conventionally, it is the same controller to decode and buffer the subcode block 24 and the main data block 26. However, the time for decoding the subcode block 24 is different from that for the main data block 26. Therefore the main data block 26 buffered in the buffer memory lags behind the subcode block 24. If the lags of each buffering are different, such lags may cause data loss or data overlap in the buffer memory, resulting in pop noise when the user listens to the music in the CD. Even one can make the lags consistent. However, the loss of data may still cause some audio data loss when copying data.

SUMMARY OF THE INVENTION

Accordingly, an objective of the invention provides a method and a system for buffering a data file to a buffer memory to solve the problems in the prior art.

In a preferred embodiment, the present invention provides a method for reading a coded audio data file in an optical storage medium and buffering the coded audio data file to a buffer memory. The audio data file comprises a plurality of blocks that are stored sequentially in a plurality of storing units in the optical storage medium. Each block is divided into a subcode block and a corresponding main data block. The subcode block comprises a plurality of coded subcodes. The main data block correspondingly comprises coded audio data.

The method of this invention firstly designates a starting block where buffering starts, then searches for the starting block in the blocks of the optical storage medium. After the starting block is searched, trigger a main data decoding procedure to decode the starting block and the main data blocks in later blocks. After decoding, sequentially buffer the decoded audio data respectively in a plurality of corresponding buffer units in the buffer memory. Finally, according to the timing when the main data decoding procedure is triggered, decides the timing when the decoded subcodes should be buffered to said buffer memory, in order that the subcodes and corresponding audio data which belong to the same block before decoding can be buffered to the same buffer unit after respectively decoded.

The method of the present invention first designates a starting block where buffering starts, and decides the timing when the decoded subcodes should be buffered to the buffer memory according to the timing when the main data decoding procedure is triggered. Thereby, the subcode and corresponding audio data that belong to the same block before decoding can be buffered to the same buffer unit after respectively decoded. The method can also avoid any offset between the target block and the starting block. Thus the method can solve the problem of pop noise when the user listens to the music in the CD and the problem of data loss during data copy.

The advantage and spirit of the invention may be understood by the following recitations together with the appended drawings.

BRIEF DESCRIPTION OF THE APPENDED DRAWINGS

DETAILED DESCRIPTION OF THE INVENTION

The present invention provides a method and a system for reading a coded audio data file in an optical storage medium and buffering the audio data file to a buffer memory. The optical storage medium is an audio disc and the buffer memory can be a DRAM. The method of the present invention is applicable to various types of optical storage format, such as compact disk-digital audio (CD-DA) disk, compact disk-extended architecture (CD-ROM XA) disk, compact disk-recordable (CD-R) disk, and compact disk-rewritable (CD-RW) disk, or others with digital-audio data format.

Figure 1:
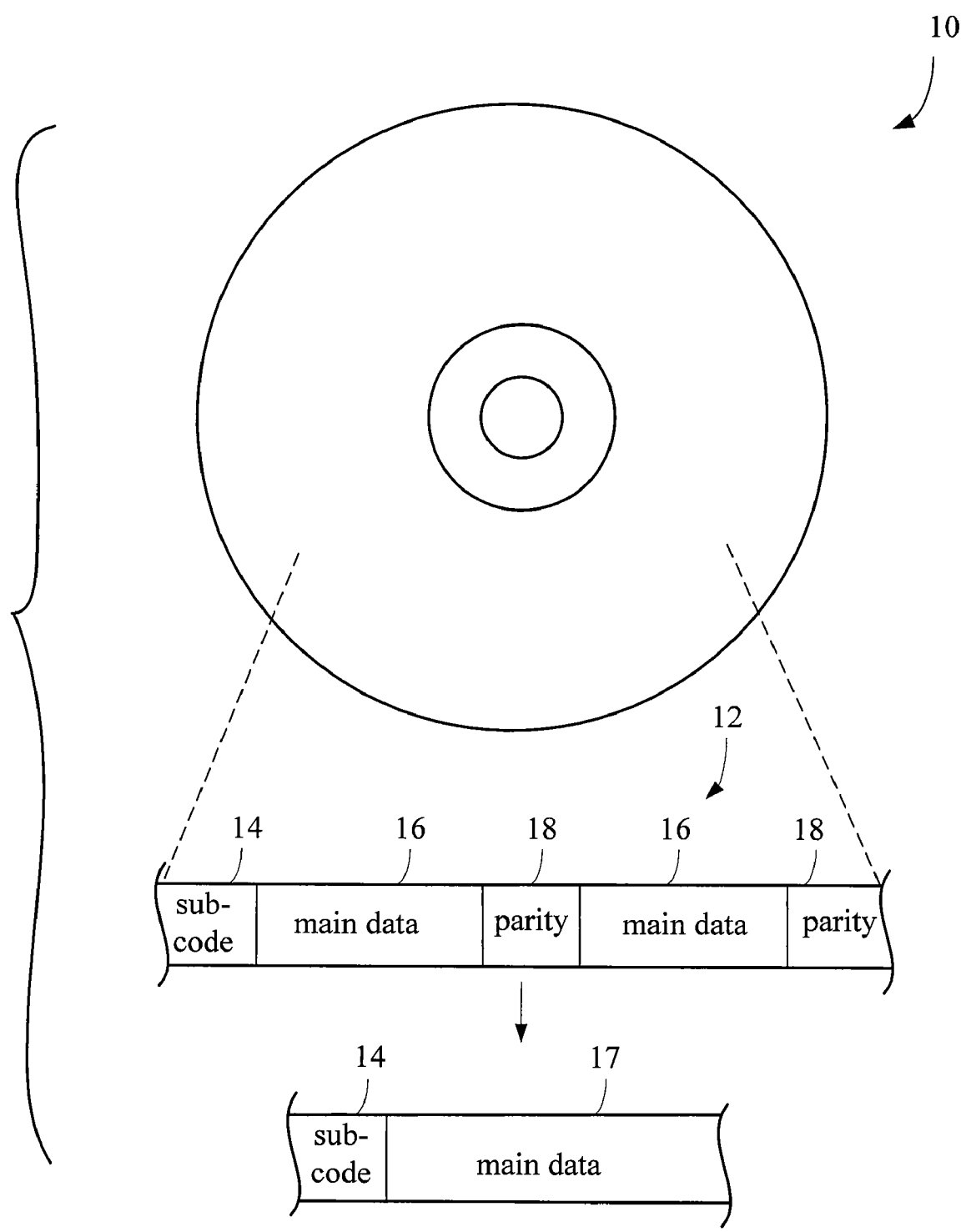
FIG. 1 is a schematic diagram of data arrangement for a conventional audio compact disk.
Figure 2:
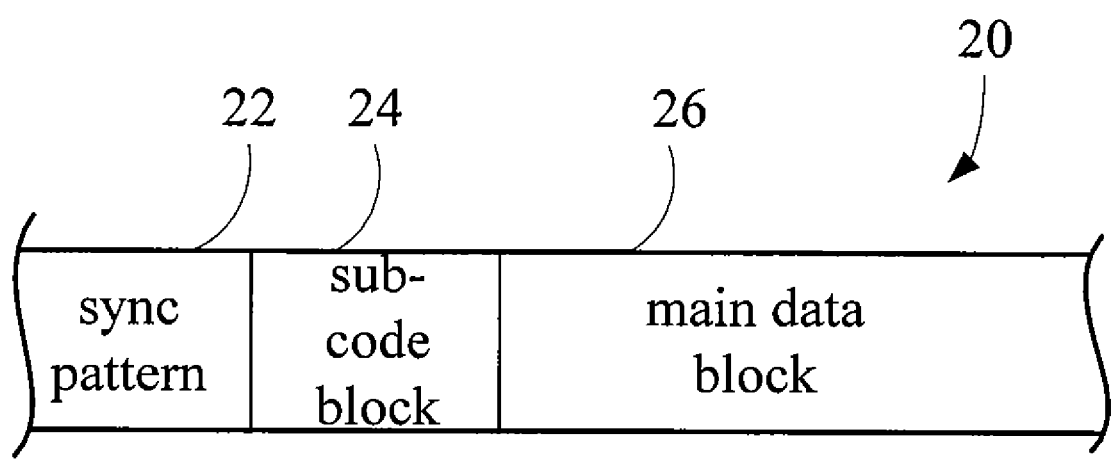
FIG. 2 is a schematic diagram of a block constituted with the frames shown in FIG. 1.
Figure 3:
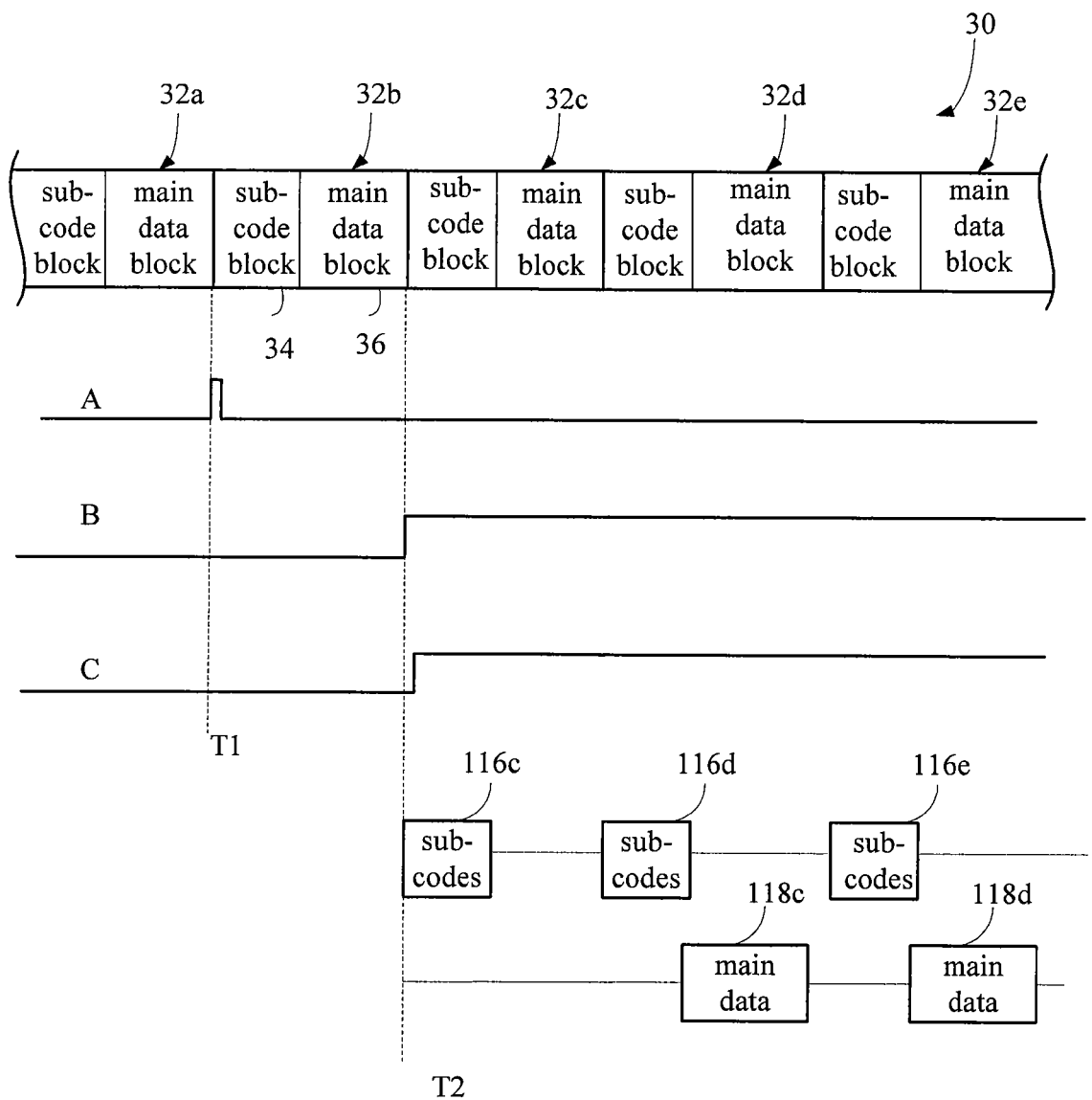
FIG. 3 is a schematic diagram of data arrangement and buffering timing of an audio data file according to the present invention.

Please refer to FIG. 3. FIG. 3 is a schematic diagram of data arrangement and buffering timing of an audio data file 30 according to the present invention. The audio data file 30 comprises a plurality of blocks 32 (a, b, c, d, e) sequentially stored in a plurality of storing units of the CD. Each block 32 is divided into a subcode block 34 and a corresponding main data block 36. The subcode block 34 comprises a plurality of coded subcodes, and the main data block 36 correspondingly comprises coded audio data.

Figure 4:
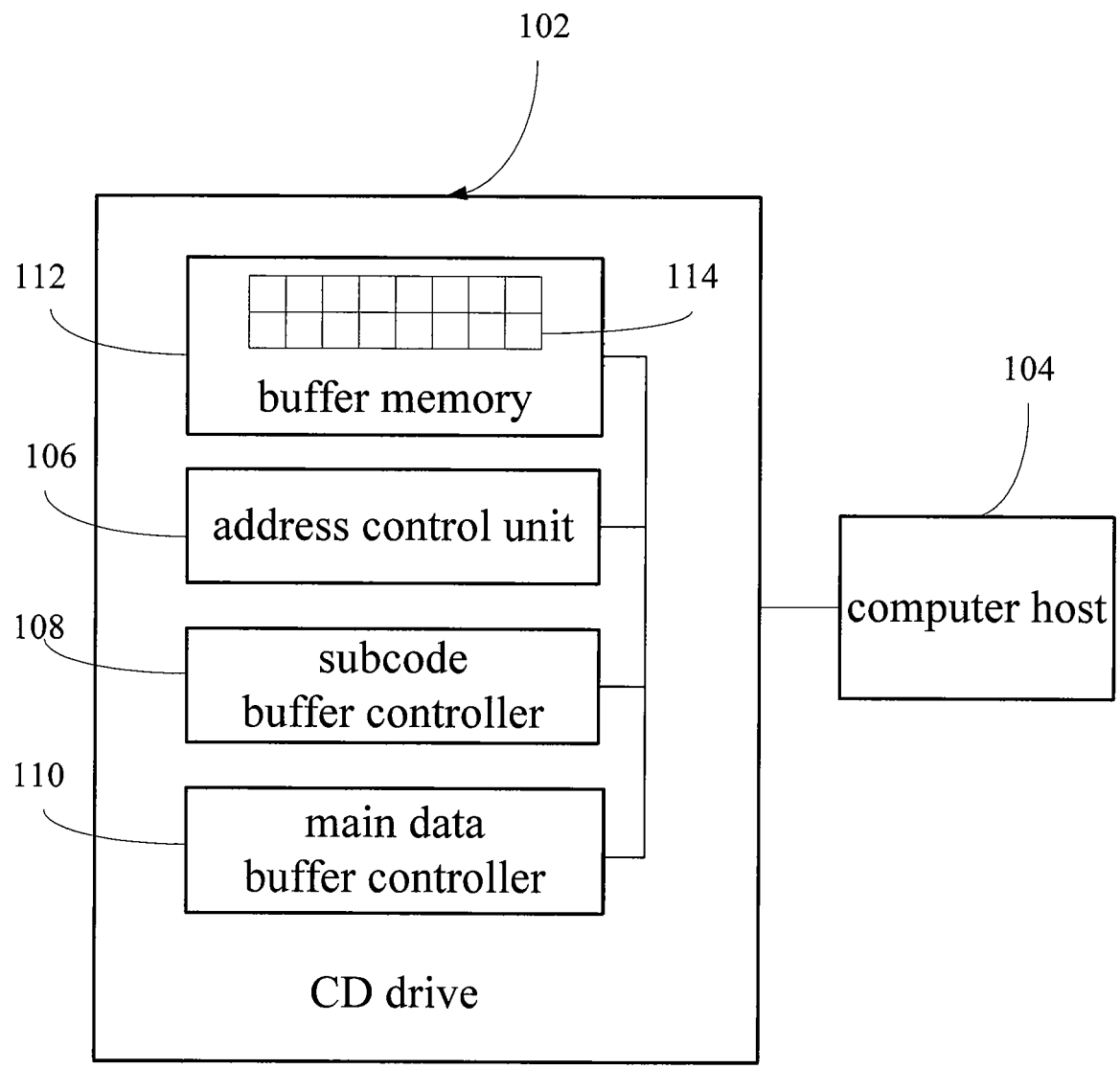
FIG. 4 is a functional block diagram of a CD drive and a computer host according to the present invention.

Please refer to FIG. 4. FIG. 4 is a functional block diagram of a CD drive 102 and a computer host 104 according to the present invention. In an embodiment, a CD drive 102 comprises a buffer memory 112, an address control unit 106, a subcode buffer controller 108, and a main data buffer controller 110. The CD drive 102 connects to a computer host 104 and receives a reading command from the computer host 104 to proceed the method of the present invention. After the CD drive 102 reads the coded audio data file in the CD, the audio data file is buffered to the buffer memory 112.

The buffer memory 112 comprises a plurality of buffer units 114. Each buffer unit 114 comprises a subcode unit (not shown in FIG. 4) and a main data unit (not shown in FIG. 4) to respectively and correspondingly store the decoded subcodes and audio data of the blocks 32 temporally. According to the present invention, after reading the decoded audio data file in the optical storage medium, the decoded audio data are buffered into the buffer memory 112.

The address control unit 106 is used for designating a starting block where buffering starts. The address control unit 106 is also used for decoding the subcode blocks 34 after the starting block in the CD with a subcode decoding procedure to obtain the subcodes in the subcode block 34, and for searching for the starting block. After the starting block is searched, the address control unit 106 emits a matching flag to the subcode buffer controller 108 and the main data buffer controller 110, so as to respectively trigger the later subcode decoding procedure of the subcode buffer controller 108 and trigger a main data decoding procedure of the main data buffer controller 110.

The subcode buffer controller 108 is used for continuously proceeding with the subcode decoding procedure. After receiving the matching flag, which means the starting block is searched, continuously proceed to correspondingly decode the subcode block 34 in the blocks after the starting block. After decoding, the subcode buffer controller 108 sequentially buffers the decoded subcodes respectively into the corresponding buffer units 114 in the buffer memory 112.

The main data buffer controller 110 is used for proceeding with the main data decoding procedure. After receiving the matching flag, which means the starting block is searched, the main data buffer controller 110 proceeds to correspondingly decode the main data blocks 36 in the starting block and the blocks 32 after the starting block. The main data buffer controller 110 also sequentially buffers the decoded audio data respectively in the corresponding buffer units 114 in the buffer memory 112.

Figure 5:
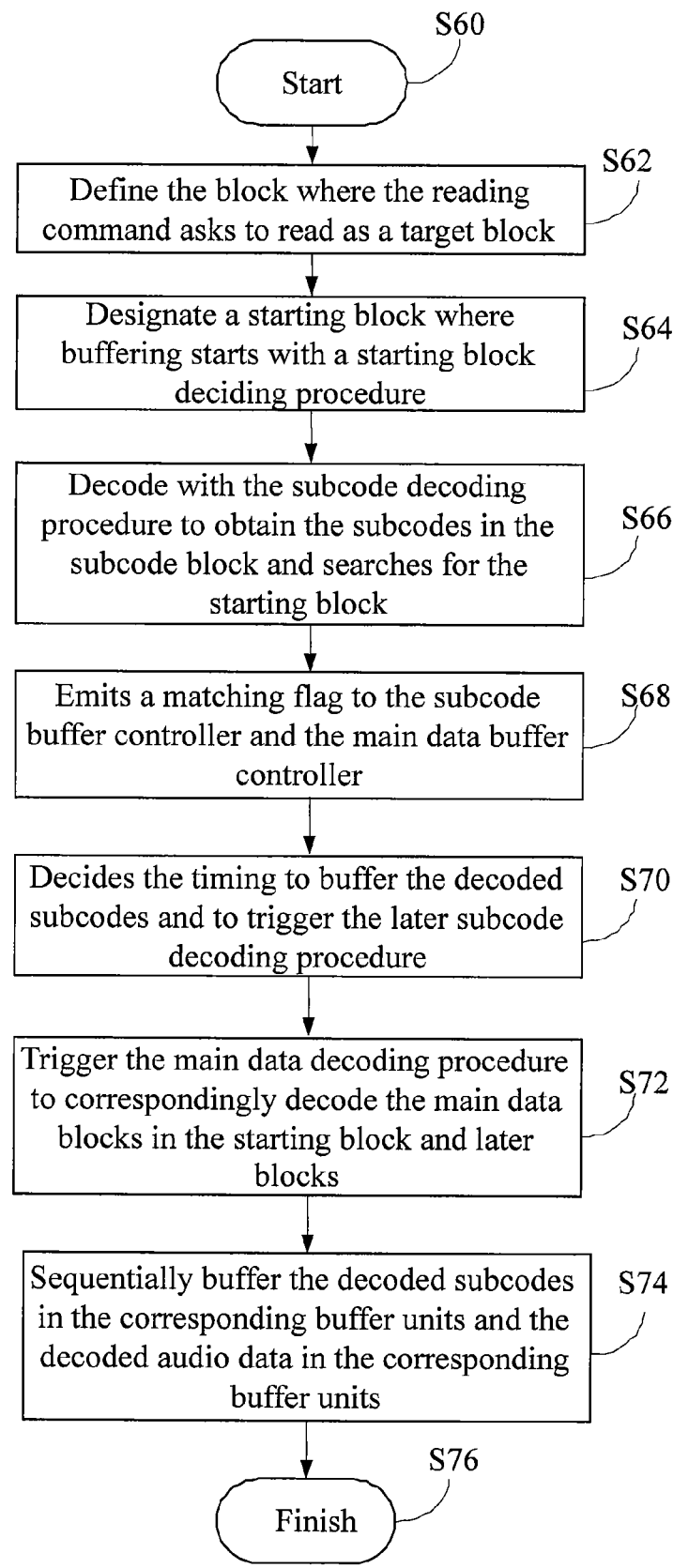
FIG. 5 is a flow chart for the buffering method of the present invention.

Please refer to the FIG. 4 and FIG. 5. FIG. 5 is a flow chart for the buffering method of the present invention. When the CD drive 102 receives a reading command from the computer host 104 to read a coded audio data file in the optical storage medium and buffers the audio data file to the buffer memory 112, the method of the present invention is performed. The method comprises the following steps:

Step S60: Start.

Step S62: Define the block 32 where the reading command asks to read as a target block.

Step S64: The address control unit 106 designates a starting block where buffering starts with a starting block deciding procedure.

Step S66: The address control unit 106 decodes with the subcode decoding procedure to obtain the subcodes in the subcode block 34 and searches for the starting block in the blocks 32.

Step S68: The address control unit 106 emits a matching flag to the subcode buffer controller 108 and the main data buffer controller 110, after the starting block is searched.

Step S70: According to the timing when the main data decoding procedure is triggered, the subcode buffer controller 108 decides the timing to buffer the decoded subcodes to the buffer memory 112 and the timing to trigger the later subcode decoding procedure.

Step S72: The main data buffer controller 110 triggers the main data decoding procedure to correspondingly decode the starting block and the main data blocks 36 in later blocks 32 after receiving the matching flag.

Step S74: After decoding, the subcode buffer controller 108 sequentially buffers the decoded subcodes in the corresponding buffer units 114, and the main data buffer controller 110 sequentially buffers the decoded audio data in the corresponding buffer units 114. The subcode and corresponding audio data belonging to the same block 32 before decoding are buffered to the same buffer unit 114 after respectively decoded.

Step S76: Finish.

In step S64, the starting block is decided with the starting block deciding procedure according to the whole decoding process and the target block where the reading command from the host asks to read. In the deciding procedure, the CD drive first executes a normal reading and buffering procedures for once to check the number of blocks 32 which are distanced between the subcodes and the audio data stored in the buffer unit 114. Then the CD drive counts the number of blocks back from the target block every time when reading the optical storage medium to decide the starting block. The number of blocks depends on the architecture and time delay of the main data buffer controller.

Please refer to FIG. 3. Followings explain an embodiment according to the present invention. In FIG. 3, the block 32a is the target block, which the reading command asks to read. Referring to the line A, the line A represents the timing when the address control unit 106 emits a matching flag after the address of the target block is searched. The address control unit 106 searches the block 32a in the blocks of the CD. The way to search the block 32a is that the address control unit 106 sequentially decodes the subcodes in the subcode blocks 34 with the subcode decoding procedure, and buffers the subcodes to a temporary memory in the address control unit 106. Also, the address control unit 106 judges whether the block is the block 32a using the address in the subcodes. When the block 32a and the sync pattern of the block 32b are searched, the address control unit 106 can make sure that the complete block 32a has been searched. The address control unit 106 immediately emits the matching flag respectively to the subcode buffer unit 108 and the main data buffer unit 110. The dotted line T1 indicates the timing for emitting the matching flag.

Please refer to the line B and line C in FIG. 3. The line B and line C respectively represent the timings that the subcode buffer unit 108 and the main data buffer unit 110 trigger their own decoding procedure. The dotted line T2 represents the timing that the subcode buffer unit 108 buffers the decoded subcodes to the buffer memory 112. In general, after receiving the matching flag, the subcode buffer unit 108 can immediately proceed the subcode decoding procedure and buffer the decoded subcodes 32b to the buffering memory 112. However, there is no header in the main data block for an audio data file, and only the sync patterns of the subcode block indicate the beginning of a block. Because the main data buffer controller 110 has to wait for the decoding procedure for the sync pattern, there will be one block 32b between where the main data buffer controller 110 receives the matching flag and where the main data buffer controller 110 triggers the main data decoding procedure. Therefore, the main data buffer controller 110 then starts triggering the main data decoding procedure from the block 32c, and buffers the decoded data of the block 32c to the main data unit 118c in the buffering unit 114. Consequently, in this embodiment, there will be one-block distance between the subcodes and the main data buffered in the same buffering unit 114.

Actually, the number of blocks as a distance between the subcodes and the main data buffered in the buffering unit is decided by different timings when triggering the main data decoding procedures for different optical drives. Therefore, the timing to trigger the main data decoding procedure should be adjusted according to the architecture and time delay of the main data buffer controller 110.

In order to avoid such one-block distance between the subcodes and the main data buffered in the same buffering unit 114, the method of the present invention postpones the timing for the subcode buffering unit 108 to buffer the decoded subcode to the buffer memory 112, after receiving the matching flag, and to trigger the later subcode decoding procedure. The timing is postponed to the block 32c, and the block 32c is the starting block. The subcode buffer unit 108 buffers the decoded subcode of the block 32c to the subcode unit 116c in the buffer unit 114 at time T2. The main data buffer controller 110 also starts from the block 32c to sequentially buffer the decoded main data to the main data unit 118c in the buffer unit 114.

Because starting the main data decoding procedure needs a period for about 110 frames, the timing to buffer the main data unit 118c lags behind the time T2 for 110 frames. Although there is a lag, the subcode and the main data buffered in the same buffer unit 114 are both from the block 32c.

However, there is a two-block distance between the block 32c and the target block 32a where the computer host asks to read after all. This results in an offset for two blocks between the main data buffered and the audio data originally recorded in the CD. Therefore, the address control unit 106 counts two blocks back from the block 32c according to the offset every time when reading the CD, allowing the block 32a to be the starting block. Thereby, as long as taking the block that is two blocks back from the target block where the computer host asking to read as the starting block, the data buffered in the buffer memory are data starting from the target block.

The method of the present invention first designates a starting block where buffering starts, and decides the timing when the decoded subcodes should be buffered to the buffer memory according to the timing when the main data decoding procedure is triggered. Thereby, the subcode and corresponding audio data, both of them belong to the same block before decoding, can be buffered to the same buffer unit after respectively decoded. The method can also avoid any offset between the target block, where the computer host asks to read, and the starting block, where buffering starts. Thus the method can solve the problems of pop noise and data loss described in the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for reading audio data file with a plurality of blocks in an optical storage medium, and buffering the audio data file to a buffer memory, wherein each block is divided into a subcode block with a subcode and a corresponding main data block with main data, the method comprising:
    designating a starting block where buffering starts, obtaining the subcodes of the subcode block, and searching for the starting block in the optical storage medium;
    when the starting block is searched, decoding the starting block and the main data blocks in later blocks, then sequentially buffering decoded audio data respectively in a plurality of corresponding buffer units in the buffer memory after performing decoding; and
    when the main data is decoded, deciding the timing when said decoded subcodes should be buffered to said buffer memory, in order that said subcodes and corresponding audio data which belong to the same block before decoding can be buffered to the same buffer unit after respectively decoded;
wherein an optical storage device gets a number of blocks between the subcodes and the audio data stored in the buffer memory, and the optical storage device counts the number of blocks back from a target block to decide the starting block.

2. The method of claim 1, wherein after the starting block is searched, a matching flag will be emitted to a subcode buffer controller and a main data buffer controller, so as to respectively trigger to decode the later subcode of the subcode buffer controller and trigger the main data buffer controller.

3. The method of claim 2, wherein at least one block is distanced between where the main data buffer controller receives the matching flag and where the main data buffer controller triggers the main data to be decoded; the number of the distanced blocks is decided by the timing of the main data is triggered to be decoded.

4. The method of claim 2, wherein the starting block is searched by an address control unit, and the address control unit also emits the matching flag after the starting block is searched.

5. The method of claim 1, wherein the buffer memory comprises the buffer unit to correspondingly store the decoded subcodes and audio data.

6. The method of claim 5, wherein each of the buffer unit comprises a subcode unit and a main data unit; both the subcode unit and the main data unit are used to respectively store the decoded subcodes and audio data.

7. The method of claim 6, wherein the buffer memory comprises a DRAM.

8. A system for reading audio data file with a plurality of blocks in an optical storage medium, and buffering the audio data file to a buffer memory, wherein each block is divided into a subcode block with a subcode and a corresponding main data block with main data, the system comprising following elements:
    an optical storage device connected to a computer host and receiving a reading command from the computer host;
    an address control unit, used for designating a starting block where buffering starts, decoding the blocks after the starting block to obtain the subcodes in the subcode blocks, and searching for the starting block in the blocks of the optical storage medium;

a subcode buffer controller, used for continuously proceeding decoding of the subcodes, after the starting block is searched, to correspondingly decode the subcode block in the blocks after the starting block, and sequentially buffering the decoded subcodes, after decoding performed, respectively in a plurality of corresponding buffer units in the buffer memory; and a main data buffer controller, used for proceeding decoding of main data, after the starting block is searched, correspondingly decode the main data blocks in the starting block and the blocks thereafter, and sequentially buffering the decoded audio data respectively in the corresponding buffer units of the buffer memory;

wherein the optical storage gets a number of blocks between the subcodes and the audio data stored in the buffer memory, and the optical storage device counts the number of blocks back from a target block to decide the starting block.

9. The system of claim 8, wherein after the starting block is searched, the address control unit emits a matching flag to the subcode buffer controller and the main data buffer controller, so as to respectively trigger to decode the later subcode of the subcode buffer controller and trigger the main data buffer controller.

10. The system of claim 9, wherein at least one block is distanced between where the main data buffer controller receives the matching flag and where the main data buffer controller triggers the main data to be decoded; the number of the distanced blocks is decided by the timing of the main data is triggered to be decoded.

11. The system of claim 8, wherein the buffer memory comprises the buffer units to correspondingly store the decoded subcodes and audio data.

12. The system of claim 11, wherein each of the buffer unit comprises a subcode unit and a main data unit; both the subcode unit and the main data unit are used to respectively store the decoded subcodes and audio data.

13. The system of claim 8, wherein the optical storage medium is a Compact Disc with digital-audio data format.

* * * * *